Dec. 19, 1961 P. MINICUCCI, JR 3,013,834
RELEASE MECHANISM
Filed April 14, 1958 2 Sheets-Sheet 2
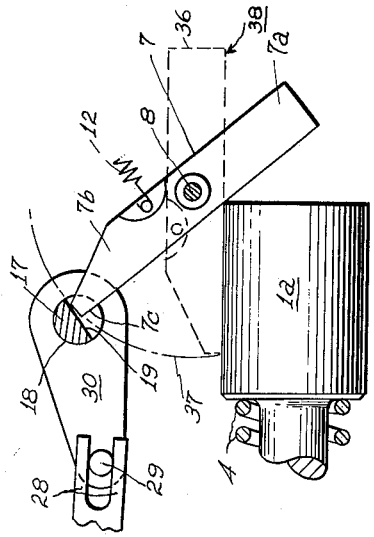
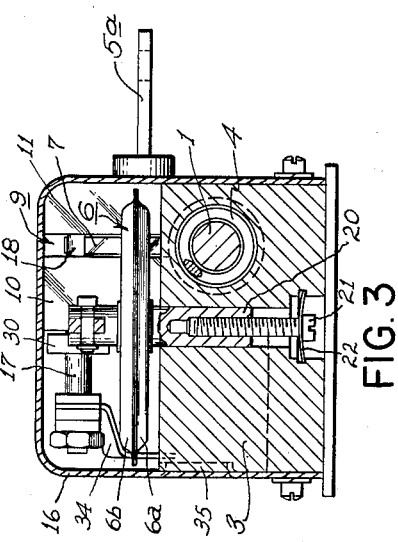
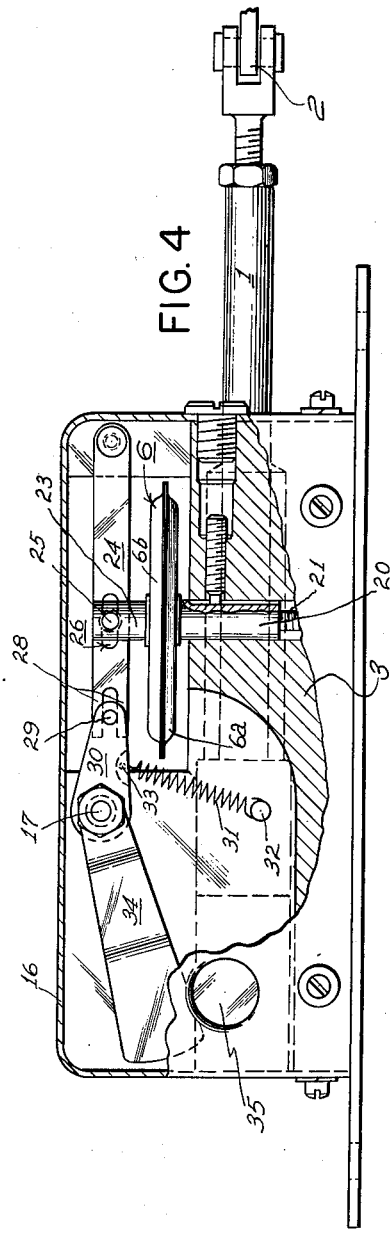
INVENTOR.
Peter Minicucci, Jr.
BY
Dike, Thompson & Bronstein
ATTORNEYS 3,013,834
RELEASE MECHANISM
Peter Minicucci, Jr., Providence, R.I., assignor to Speidel Corporation, Providence, R.I., a corporation of Rhode Island
Filed Apr. 14, 1958, Ser. No. 728,163
3 Claims. (Cl. 294—83)

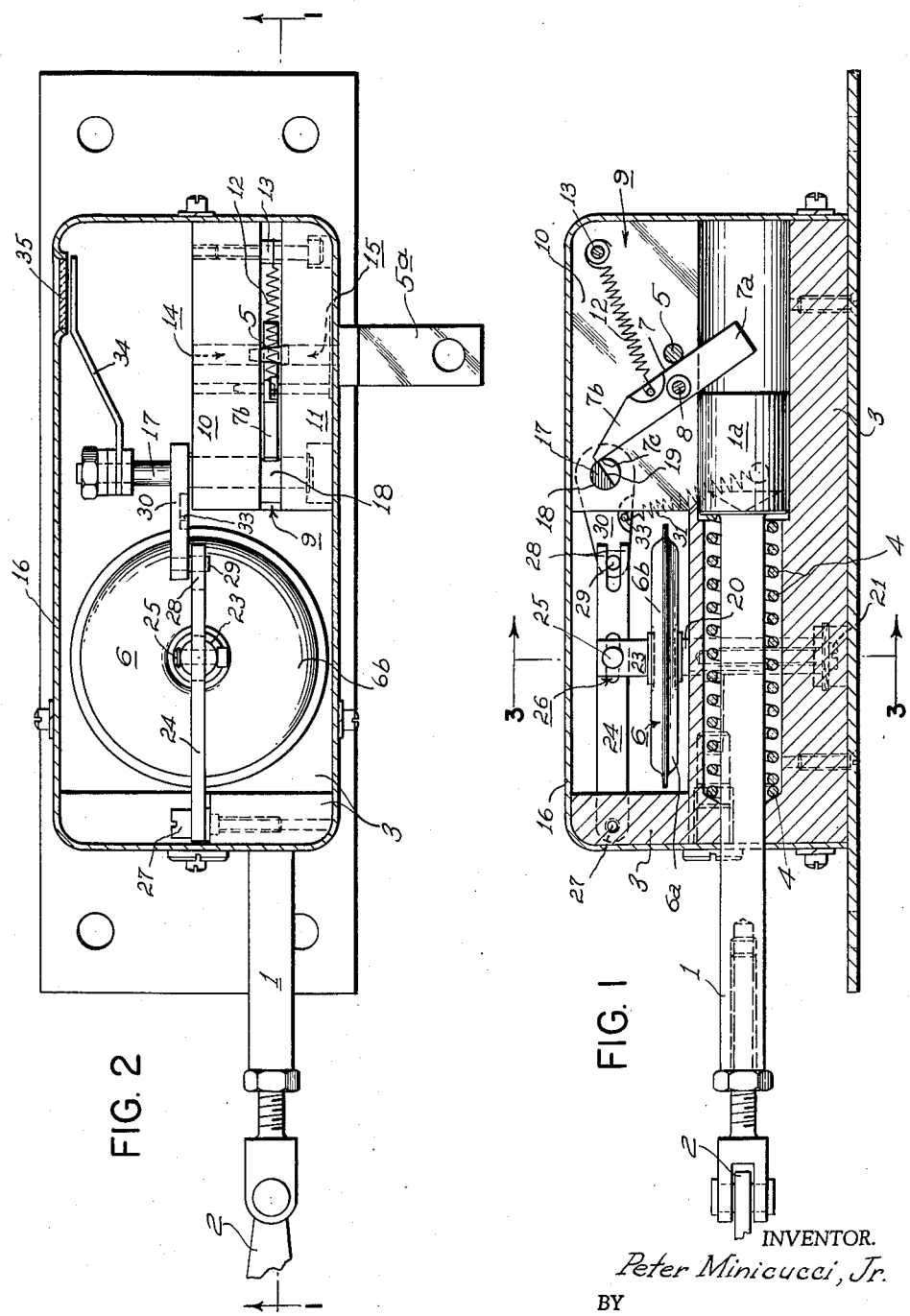

The present invention relates to automatic actuating mechanisms and, in one particular aspect, to improved emergency release mechanisms operating to safeguard aircraft personnel.

Upon occurrence of emergency conditions aboard an airborne craft, and irrespective of the existing speed and altitude, ejection of parachute-equipped personnel obviously must be brought about as swiftly and safely as possible. In one bail-out process, for example, the protective transparent canopy is first loosened, the pilot and protective seat are next explosively thrust from the airframe as a unit, the relatively massive seat is then separated from the pilot at an early convenient time during descent when its protective functions are exhausted, and, finally, the parachute rip cord is actuated when a safe altitude is reached. Virtually all of the involved steps in the escape process must be under wholly automatic control, to insure protection of incapacitated personnel and to achieve protection under speed or other environmental conditions rendering human responses and control inadequate. In other applications, such as the landing of cargo rather than personnel, the actuating and release mechanisms are necessarily fully automatic in their operation. It will thus be readily understood that equipments for executing these vital functions should possess most precise and instantaneous operating characteristics and should be highly immune to failure under the extraordinarily severe environmental conditions experienced during flight and ejection. Flight pay load considerations dictate that such equipments be of both small size and weight; maintenance and reliability problems point up the desirability of simple mechanisms, few parts, and self-monitoring features; and, the required responses to measured conditions such as speed and altitude emphasize the need for sensitive precision control mechanisms which can nevertheless release vast forces for actuation purposes.

Accordingly, it is one of the objects of the present invention to provide improved apparatus for the controlled rapid release of large mechanical forces wherein control elements of simple low-cost construction are sensitively responsive to relatively small measurement forces.

A further object is to provide improved pressure-responsive apparatus for control in personnel or cargo ejection and landing from aircraft, involving small and uncomplicated mechanisms which operate reliably and accurately under severe environmental conditions.

By way of summary account of practice of this invention in one of its aspects, there is provided a pressure sensor which delivers linear output movements to a mechanism which converts these movements to accurately corresponding angular orientations of a control shaft. This control shaft is transversely slotted over a short length, such that its cross-section is that of a segment of a circle having an arc which may serve as a cam surface. A pivoted arming lever, which normally engages the cylindrical cam surfaces of the shaft in a substantially tangential relationship, physically interferes with an output thrust shaft which is strongly biased by a compressed force spring, whereby the thrust shaft can be moved to deliver an output force only when the control shaft is critically angularly oriented to permit an end of the arming lever to deflect through the control shaft slot and remove the interference to thrust shaft movement. Large biasing forces exerted upon the restrained thrust shaft are advantageously isolated from, and cannot reflect against, the relatively sensitive pressure sensor which initiates the release of the thrust shaft, and an added spring biasing in the mechanism between the pressure sensor and control shaft improves accuracy by overcoming backlash and resisting undesired movements due to accelerations and shock.

Although the features of this invention which are believed to be novel are set forth in the appended claims, the details of preferred embodiments and further objects and advantages may be most readily comprehended through reference to the following description taken in connection with the accompanying drawings, wherein:

FIGURE 1 displays a partly cross-sectioned side view of an aneroid-actuated power release apparatus in which the teachings of the present invention are practiced;

FIGURE 2 is a plan view of the apparatus of FIGURE 1 with portions cut away to exhibit internal constructional features;

FIGURE 3 is a cross-sectioned end view of the same apparatus;

FIGURE 4 provides a longitudinal cross section of the power release mechanism viewed from the side opposite that depicted in FIGURE 1; and FIGURE 5 portrays certain power release elements in enlargement and in conditions of actuation.

The arrangement for practicing this invention which is portrayed in FIGURE 1 includes an output thrust shaft 1, the controlled longitudinal movement of which actuates a mechanism 2 of any desired character. In one application, for example, mechanism 2 may comprise a firing mechanism for the release of pilot seat straps. Desired output thrust forces are those which are exerted between thrust shaft 1 and a support bracket 3 by a main spring 4 which has been compressed to the illustrated state in a preceding arming operation. Release of the stored spring forces is under control of both a removable arming pin 5 and a pressure-responsive unit 6, the latter being portrayed as an evacuated aneroid capsule unit.

In the fully armed condition of the power release assembly, the spring forces which have been accumulated in the pre-stressed main spring 4 and which seek to release themselves by moving the output shaft 1 to the right, in FIGURES 1 and 2, are opposed by the flat arming lever 7. Shaft 8 mounts this lever for pivotal movement in the accommodating narrow gap 9 between two parallel frame members 10 and 11 which are integral portions of the bracket 3, and a cooperating spring 12 stretched between a bracket pin 13 and the arming lever 7 continuously biases the lever in an angular direction opposite to that in which it tends to be moved by the enlarged end 1a of the thrust rod. The illustrated point of engagement between thrust rod end 1a and the end 7a of flat arming lever 7 is intentionally preserved at only a short moment arm from the axis of pivot shaft 8. Arming pin 5 fits slidably within a pair of aligned accommodating openings 14 and 15 in frame members 10 and 11, respectively, and projects through gap 9 at a position where it interferes with angular movement of the arming lever end 7a. Force of the thrust rod exerted against lever end 7a is thus opposed by pin 5, and the stored energy in compressed spring 4 cannot be released while this pin is set in position within the frame openings 14 and 15. However, the end 5a of the arming pin which extends outside of the mechanism casing 16 can be moved, as by a cable or linkage, not shown, to withdraw the pin 5 and to free arming lever 7 from its interference. In the case of aircraft seat separation control, for example, the end 5a is coupled to the air frame, whereby explosive ejection of the seat from the craft causes the arming pin to be withdrawn and, thereby, to ready the release mechanism for actuation by the pressure-responsive unit 6.

Except for a further possible interference offered by a slotted control shaft 17, arming lever 7 would be forced angularly about the axis of its pivot shaft 8 and would then permit the thrust rod 1 to be rapidly actuated by the stressed main spring 4. As may be perceived in FIGURES 1, 2 and 3, however, the cylindrical control shaft 17 is disposed such that it may constitute an obstruction to such angular movement of the arming lever, depending upon the pressure conditions sensed by the actuating unit 6. For this purpose, control shaft 17 is journalled in the frame members 10 and 11 which constitute sleeve bearings enabling angular movement of the shaft, the longitudinal axis of the control shaft being parallel with the pivot axis of the arming lever 7. The spacing between shafts 8 and 17, and the shape and length of arming lever end 7b, are selected such that flat edge surface 7c of lever end 7b may engage cylindrical surfaces 18 of the control shaft under normal conditions prior to release of the thrust rod. Alternatively, arming pin 5 may be disposed to prevent the arming lever surface 7c from coming into engagement with the control shaft surface 18 until the arming pin is withdrawn, thereby entirely freeing the actuating mechanism for the control shaft from torques reflected from the thrust rod.

The portion of control shaft 17 which passes through the frame gap 9 and which may be engaged by the lever end 7b is transversely slotted to possess a cross section which is that of a segment of a circle, as appears in both FIGURES 1 and 5. The chord 19 of this shaft, viewed in cross section, is disposed such that the end 7b of the arming lever may drop from surface 18 and pass freely through the slotted portion of shaft 17 without interference when the shaft has assumed a particular angular orientation, thereby permitting the lever to be moved out of interfering relationship to the thrust rod end. This critical angular orientation of the control shaft is brought about by the aneroid unit 6 only when it senses a barometric pressure above a predetermined value related to a predetermined altitude, however. For this actuating purpose, the aneroid unit 6, which may comprise sealed flexible diaphragms 6a and 6b forming an evacuated chamber, is connected to translate its linear output movements into accurately corresponding angular movements of the control shaft 17. Lower aneroid diaphragm 6a is mounted upon a stud 20 slidable within an opening in bracket 3 under influence of an adjusting screw 21 locked within the bracket by a spring washer 22, whereby simple adjustment of screw 21 permits the entire aneroid unit to be set for critical actuation of shaft 17 at a predetermined pressure. A yoke 23 secured to upper diaphragm 6b, which moves linearly along an axis colinear with that of stud 20 as ambient pressures vary, is coupled with a link arm 24 by way of a pin 25 which passes through an elongated slot 26 in the link arm. One end of link arm 24 is supported for angular movement about a pivot 27 fixed with bracket 3, and the opposite end is slotted to form a yoke 28 which moves with a mechanical advantage as the aneroid pivots link arm 24. Yoke 28 cooperates with a pin 29 which is moved thereby and which, in turn, angularly displaces the affixed crank arm 30 fastened to the control shaft 17. It will thus be perceived that linear movements of diaphragm 6b are converted to angular movements of link arm 24, control shaft crank arm 30, and control shaft 17. The simple yoke and pin couplings are of especially economical manufacture and can be used with particular advantage in this construction where the angular movements required for control are relatively small. It is highly important, however, that the couplings do not permit even small unintended angular displacements to occur, else the mechanism may be erroneously actuated. For example, any coupling looseness, such as in the coupling of yoke 28 and crank pin 29, would permit control shaft 17 to turn under influence of vibration or shock, thus causing the thrust rod 1 to be operated improperly, or, such looseness would prevent the control linkage from having precise repeatability of operation. It would of course be possible to attempt avoidance of such difficulties by forming each coupling as a precision unit having negligible looseness, although the manufacturing and assembly costs would be substantially heightened. Instead, however, the difficulties are effectively and simply overcome by spring forces which preserve the linkage elements in a continuously biased condition. The spring 31 which is stretched between post 32 on bracket 3 and pin 33 on crank arm 30, achieves such biasing. As is best observed through reference to the FIGURE 4 illustration, the torque exerted upon control shaft crank arm 30 by spring 31 causes crank pin 29 to bear continuously upon the lower leg of yoke 28 and further causes the link arm surfaces along the upper edge of slot 26 to bear continuously upon the yoke pin 25 fixed with the upper aneroid diaphragm 6b. Such minute clearances as may exist elsewhere in these two couplings are then of no consequence in the linkage, since they cannot enter into the drive path from the aneroid to the control shaft. Backlash effects are thus eliminated.

In the event leakage should develop in the evacuated aneroid unit, the upper diaphragm will expand upwardly and occasion rotation of the control shaft in a sense prohibiting release of the thrust rod by arming lever 7. Inasmuch as this condition is to be avoided, a warning indication is desirable, and simple and effective provision is made for this by way of a warning flag 34 which rotates with control shaft 17 to be brought into view through the window 35 in casing 16 as the diaphragm 6b expands beyond a predetermined amount.

The FIGURE 5 portrayal of portions of the release mechanism illustrates an orientation of the control shaft which permits the end 7b of the arming lever to pass through its transversely slotted portion. Such an angular orientation exists below a predetermined altitude where the sensed ambient atmospheric pressures exceed a predetermined value and thereby cause downward deflection of yoke 29 and counterclockwise movement of control shaft 17. Above this altitude, the control shaft is angularly displaced clockwise such that the lower surface 7c of the arming lever end 7b can only rest tangentially upon the cylindrical surface 18 of shaft 17. As altitude decreases to a predetermined level, with the arming pin removed, the very end of the arming lever becomes aligned with the edge of the control shaft slot and is then instantly pivoted to the dashed-line position 36. The arc described by attendant movement of the lever end is identified by reference character 37. Thrust rod end 1a moves instantly to the right, driven by the main spring 4, and performs the desired release operation, although it does not move beyond position 38 where it would free the lever for movement by its associated spring 12. It is not until thrust rod end 1a has again been fully armed by being forced to the left against main spring 4 that spring 12 can pivot the lever arm 7 in a clockwise direction and can then enable insertion of the arming pin 5 which will hold the thrust rod in the armed condition.

From the foregoing description it will be apparent that the main thrust forces in the release mechanism are not supplied to the relatively delicate actuating unit, here in the form of aneroid 6. Rather, certain large forces can only be reflected radially upon the control shaft 17 by arming lever 7 where they cannot tend to rotate the shaft. Because the arming pin 5 normally preserves arming lever surface 7c entirely out of contact with the control shaft surface 18 until the arming pin is withdrawn, even the aforesaid radial forces are normally absent and the aneroid actuating mechanism linkage normally experiences negligible frictional restrain as it moves without the changes under common flight conditions. Wear and fatigue are therefore minimized. Although a particular pressure-sensitive unit has been described, in the form of aneroid 6, it will be understood that other sensitive detecting units may be employed to control the release of vast stored forces with low-cost and uncomplicated precision mechanisms in accordance with these teachings.

Accordingly, while a particular embodiment of this invention has been shown and described herein, it will occur to those skilled in the art that various changes and modifications can be accomplished without departing either in spirit or scope from the invention as set forth in the appended claims.

What I claim as new and desire to secure by Letters Patent of the United States is:

1. Power release apparatus comprising a support, an output member mounted on said support for movement between an armed position and a released position, force-applying means urging said member from said armed position to said released position, a rotatable control shaft mounted on said support, said shaft having a cylindrical part therealong from which a portion is removed to reduce the cross-section to that of a segment of a circle and thereby to form a slot, an actuating unit producing an output of control movements, means connecting said rotatable shaft with said actuating unit for angular movements responsive to said control movements, an arming lever, means mounting said lever on said support for pivotal movement about an axis parallel with said shaft, said mounting means mounting said lever to rest tangentially upon said cylindrical part of said shaft when said shaft has predetermined angular orientations and to have an end of said lever pass freely through said slot when said shaft has other angular orientations, and said mounting means mounting said lever in position to obstruct movement of said output member from said armed position when said lever rests upon said shaft and to free said output member for movement when said lever passes through said slot.

2. Power release apparatus comprising a support, an output member mounted on said support for movement between an armed positions and a released position, a spring urging said member from said armed position to said released position, a rotatable control shaft mounted on said support, said shaft having a cylindrical part therealong from which a portion is removed to reduce the cross-section to that of a segment of a circle and thereby to form a slot, pressure-responsive means producing linear output movements responsive to changes in pressures, means connecting said rotatable shaft with said pressure-responsive means for angular movements responsive to said linear output movements, biasing spring means urging said rotatable control shaft in one angular direction about its axis of rotation and against the restraints of said connecting means and pressure-responsive means, an arming lever, means mounting said lever on said support for pivotal movement about an axis parallel with said shaft, said mounting means mounting said lever to rest tangentially upon said cylindrical part of said shaft when said shaft has predetermined angular orientations and to have an end of said lever pass freely through said slot when said shaft has other angular orientations, and said mounting means mounting said lever in position to obstruct movement of said output member from said armed position when said lever rests upon said shaft and to free said output member for movement when said lever passes through said slot.

3. Power release apparatus comprising a support including a pair of parallel frame members defining a narrow gap therebetween, an output member mounted on said support for longitudinal movement adjacent said gap between an armed position and a released position, a spring urging said output member from said armed position to said released position, a rotatable control shaft mounted on said support with a part thereof extending through said gap perpendicularly to said parallel frame members, said part of said shaft being cylindrical and having a portion removed to reduce the cross-section to that of a segment of a circle and thereby to form a slot in said shaft, pressure-responsive means producing linear output movements responsive to changes in pressures, a first lever arm pivoted on said support for angular movements, said first lever arm having at least one elongated slot therein, a pin mounted on and moved by said pressure-responsive means and extending into said elongated slot in said first lever arm, a second lever arm affixed to said rotatable shaft, means connecting said second lever arm with said first lever arm for angular movements responsive to angular movements of said first lever arm, biasing spring means urging said rotatable control shaft in one angular direction about its axis of rotation and against the restraints of said lever arms and said pressure-responsive means, a flat arming lever, means mounting said lever on said support for pivotal movement within said narrow gap about an axis parallel with said axis of rotation of said shaft, said mounting means mounting said arming lever to rest tangentially upon said cylindrical part of said shaft when said shaft has predetermined angular orientations and to have an end of said arming lever pass freely through said slot in said shaft when said shaft has other angular orientations, and said mounting means mounting said arming lever to project from said gap in position to obstruct movement of said output member from said armed position when said arming lever rests upon said shaft and to free said output member for movement when said arming lever passes through said slot in said shaft.

References Cited in the file of this patent

UNITED STATES PATENTS

| | | |
|---|---|---|
| 757,119 | Hughes | Apr. 12, 1904 |
| 2,470,457 | Bancora | May 17, 1949 |
| 2,516,902 | Musser | Aug. 1, 1950 |
| 2,707,605 | Seiverts | May 3, 1955 |
| 2,710,218 | Frazier et al. | June 7, 1955 |
| 2,726,055 | Musser | Dec. 6, 1955 |
| 2,732,245 | Lemoigne | Jan. 24, 1956 |